UNITED STATES PATENT OFFICE.

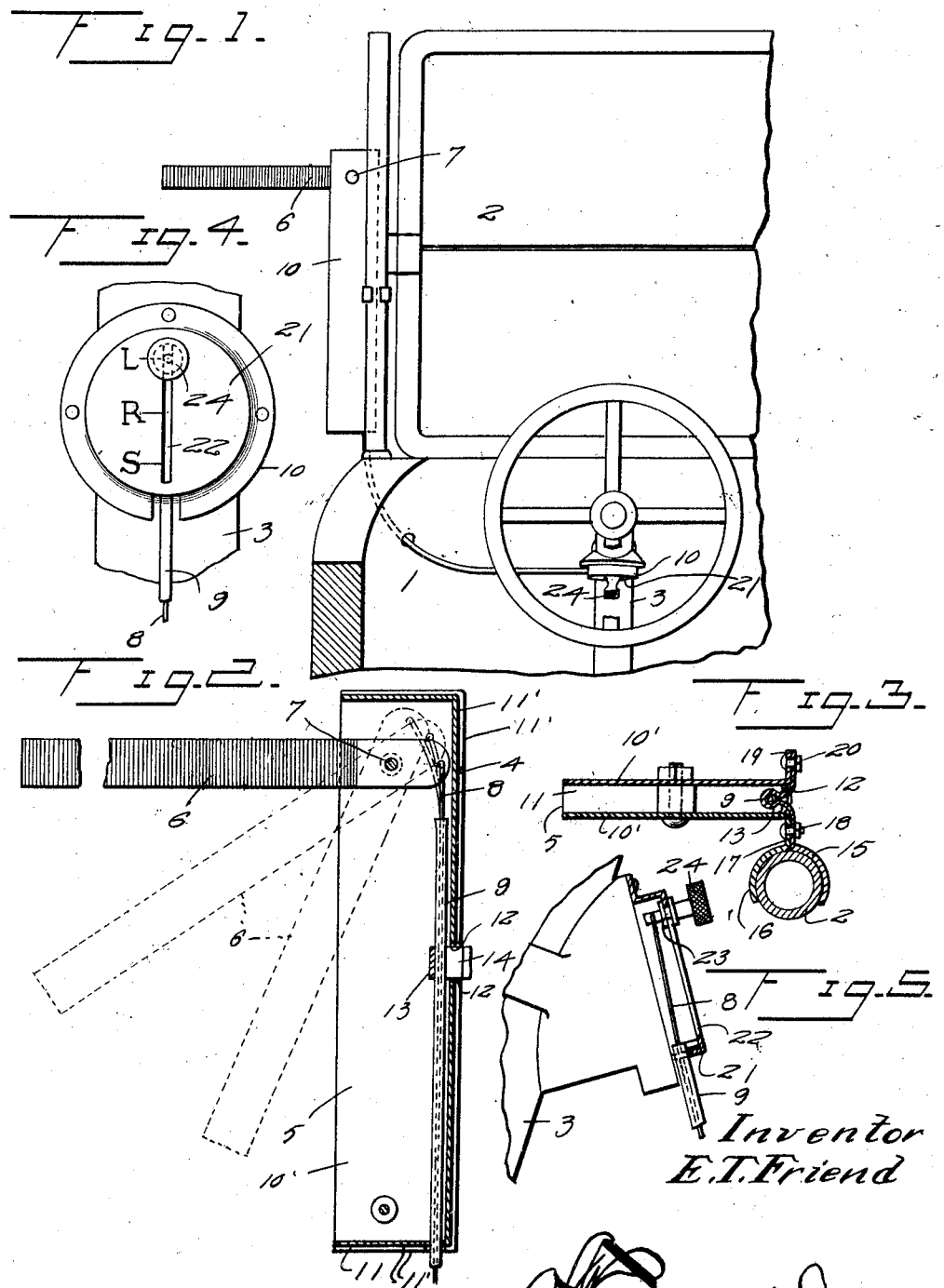

EVERT THEODORE FRIEND, OF WICHITA, KANSAS.

DIRECTION-INDICATOR.

1,361,242.  Specification of Letters Patent.  Patented Dec. 7, 1920.

Application filed March 16, 1920. Serial No. 366,250.

*To all whom it may concern:*

Be it known that I, EVERT T. FRIEND, a citizen of the United States, residing at Wichita, in the county of Sedgwick and State of Kansas, have invented certain new and useful Improvements in Direction-Indicators; and I do hereby declare the following to be a full, clear, and exact description of the invention, such as will enable others skilled in the art to which it appertains to make and use the same.

This invention relates to new and useful improvements in direction indicators and has for its primary object the provision of a signaling arm movable into and out of a casing and also movable into several positions when out of the casing to indicate various signals at the will of the operator to traffic about the respective automobile, thereby notifying the traffic of the exact procedure of said automobile and also obviating the operator placing an arm outwardly of the automobile to give a signal.

Another object of this invention is the provision of a direction indicator of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which:—

Figure 1 is a fragmentary view of an automobile illustrating a direction indicator applied thereto and constructed in accordance with my invention.

Fig. 2 is an enlarged vertical sectional view illustrating the various signaling positions of the signaling arms.

Fig. 3 is a transverse sectional view taken on the line 3—3 of Fig. 2, illustrating the means of securing the walls of the casing together and also securing the casing to an automobile wind-shield.

Fig. 4 is a detail view, illustrating the operating means secured to the steering post.

Fig. 5 is a sectional view of the same.

Referring in detail to the drawing, the numeral 1 indicates an automobile having a wind-shield 2 and a steering post 3. The foregoing description relates to a well known construction of automobile and to which my invention is applied.

A casing 4 is detachably secured to the wind-shield 2 or at any other desired point upon the automobile, and has one side fully open as illustrated at 5. A signaling arm 6 is pivoted in the upper end of the casing 4 as illustrated at 7 and has connected thereto a cable or like flexible element 8 that is received within a flexible housing 9. The flexible housing 9 leads to an operating means 10 located on the steering post 3 of the automobile 1 so that the same can be readily gripped or manipulated by the operator of said automobile for the purpose of moving the signaling arm 6 outwardly of the casing 4 into various positions as illustrated in the drawings for the purpose of indicating a turn to the right or left and also for indicating a stop.

The casing 4 consists of front and rear walls 10' which have formed thereon flanges 11 that overlap each other. A pair of the flanges 11 are provided with registering slots 12 to receive an offset portion 13 of a clamping plate 14. The offset portion 13 extends into the casing 4 and about the flexible housing 9 for the purpose of securing said flexible housing to said casing. One end of the clamping plate 14 is offset as illustrated at 15 to coöperate with an offset portion 16 of an ear 17 formed integrally with one of the walls of the casing and which ear and clamping plate are detachably connected by a fastening element 18 so that a portion of the wind-shield 2 can be firmly secured within the offset portions 15 and 16 for attaching the device to the wind-shield. The other end of the clamping plate 14 after forming the offset portion 13 extends parallel with an ear 19 and is detachably secured to said ear by a fastener 20, providing a construction wherein the walls or sections of the casing 4 are detachably connected and which permits the casing to be taken apart whenever desired. The pivot 7 of the signaling arm 6 is also removable from the casing to permit said signaling arm to be removed and so as to permit the separation of the parts or sections of the casing.

The operating means consists of a housing 21 which is detachably secured to the steering post 3 in any desired manner and is provided with a slot 22 to permit a shank 23 to extend therethrough and have secured thereon a knob or handle 24. Characters "R," "S" and "L" are arranged on the housing 21 along the slot 22 and the flexible element 8 is connected to the shank 23 so that upon moving the knob or handle 24 in alinement with said characters, the signaling arm 6 will be moved out of the casing 4 into various signaling positions to indicate turns and stops corresponding to the characters on said housing 21. The flexible housing 9 is secured to the housing 21 in any desired manner.

While I have shown and described the preferred embodiment of my invention, it will be understood that minor changes in construction, combination, and arrangement of parts may be made without departing from the spirit and scope of the invention as claimed.

Having thus described my invention, what I claim is:

A direction indicator comprising a casing including a pair of walls, flanges formed on said walls and overlapping each other and a pair of said overlapping flanges having alining slots, ears formed on the sections of said casing and disposed in opposite directions, a clamping plate detachably secured to said ears and having an offset portion extending into said casing, a signaling arm pivoted in said casing, a flexible element connected to the signaling arm, a flexible housing extending into said casing and secured therein by being received by the offset portion of the clamping plate, and means connected to the flexible element for moving the signaling arm into various signaling positions.

In testimony whereof I affix my signature in presence of two witnesses.

EVERT THEODORE FRIEND.

Witnesses:
E. E. BLECKLEY,
FANNY FAY.